(12) United States Patent
Mangrum

(10) Patent No.: US 11,479,983 B2
(45) Date of Patent: Oct. 25, 2022

(54) KEYWELL FORM RETENTION ASSEMBLY

(71) Applicant: Donald Mangrum, Sanger, CA (US)

(72) Inventor: Donald Mangrum, Sanger, CA (US)

(*) Notice: Subject to any disclaimer, the term of this patent is extended or adjusted under 35 U.S.C. 154(b) by 135 days.

(21) Appl. No.: 17/023,956

(22) Filed: Sep. 17, 2020

(65) Prior Publication Data
US 2022/0081918 A1 Mar. 17, 2022

(51) Int. Cl.
*E04G 15/06* (2006.01)
*B29C 39/26* (2006.01)
*E04G 17/14* (2006.01)

(52) U.S. Cl.
CPC .......... *E04G 15/068* (2013.01); *B29C 39/26* (2013.01); *E04G 17/14* (2013.01)

(58) Field of Classification Search
CPC ....... E04G 15/068; E04G 17/14; E04G 17/12; E04G 15/063; E04G 15/06; B28B 23/0056; B28B 7/28; B29C 33/123; B29C 39/26
USPC ...... 52/699, 700, 701; 249/63, 175, 177, 91, 249/93, 94
See application file for complete search history.

(56) References Cited

U.S. PATENT DOCUMENTS

| | | | | |
|---|---|---|---|---|
| 1,329,362 A * | 2/1920 | Bowe | ................... | B28B 7/0029 249/34 |
| 3,508,365 A | 4/1970 | Ellis | | |
| 3,642,400 A * | 2/1972 | Theodorsen | ........ | B29C 44/1266 65/DIG. 11 |
| 3,964,219 A * | 6/1976 | Hala | ..................... | E04G 15/061 52/707 |
| 4,339,106 A * | 7/1982 | Navarro | .................. | E04G 17/12 249/219.1 |
| 4,412,407 A * | 11/1983 | Melfi | ..................... | E04G 21/185 52/309.1 |
| D280,974 S | 10/1985 | Ruetsch | | |
| 4,904,111 A | 2/1990 | Weisbach | | |
| 4,963,082 A * | 10/1990 | Lindquist | ............ | B28B 19/0038 425/117 |
| 5,058,854 A * | 10/1991 | Bravo | ................. | B28B 23/0056 249/219.1 |
| 7,255,319 B2 | 8/2007 | Albano | | |
| 7,303,361 B1 | 12/2007 | Lane | | |
| 7,814,607 B1 | 10/2010 | Wilson, Sr. | | |
| 10,570,632 B1 * | 2/2020 | Hartman | .................. | E04C 5/20 |

(Continued)

FOREIGN PATENT DOCUMENTS

| | | | | |
|---|---|---|---|---|
| DE | 20120033 U1 * | 2/2002 | ............. | B25B 1/103 |
| EP | 1746220 A1 * | 1/2007 | ............. | E04G 17/12 |
| FR | 2827895 A1 * | 1/2003 | ............. | E04G 13/04 |

*Primary Examiner* — Michael Safavi

(57) ABSTRACT

A keywell form retention assembly includes post that having a bottom end and a top end. The post has a front side and a back side. A plurality of mounting holes extends through the front and back sides. The mounting holes receive fasteners to mount the post to a cement form. A sleeve is attached to the top end of the post. An arm has a first end and a second end. The arm extends through the sleeve and is movable forward or rearward through the sleeve. A leg is attached to and extends downwardly from the arm adjacent to the first end. An anchor plate is attached to the leg. The anchor plate has a mounting aperture extending therethrough to receive a coupler to engage a panel. The anchor plate retains the panel such that that panel abuts and stabilizes a keyway form.

11 Claims, 4 Drawing Sheets

(56) References Cited

U.S. PATENT DOCUMENTS

| | | | |
|---|---|---|---|
| 2003/0029130 A1* | 2/2003 | Humphrey | E04G 21/185 52/764 |
| 2003/0101670 A1* | 6/2003 | Gustin | E04G 17/12 249/34 |
| 2008/0265128 A1 | 10/2008 | Hughes | |
| 2019/0010715 A1* | 1/2019 | Koszo | E04G 17/047 |

* cited by examiner

KEYWELL FORM RETENTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cement form support device and more particularly pertains to a new cement form support device for retaining a keyway form in place in a stable condition while cement is curing. Keyways can be difficult to properly form as they require a form to be forced downwardly in liquid cement such that the form does not float upwardly from the cement or move laterally within the cement.

(2) Description of Related Art Including Information Disclosed Under 37 CFR 1.97 and 1.98

The prior art relates to cement form support devices which are used to retain forms in place while cement hardens.

BRIEF SUMMARY OF THE INVENTION

An embodiment of the disclosure meets the needs presented above by generally comprising a post that has a vertical orientation and has a bottom end and a top end. The post has a front side, a back side, a first lateral side and a second lateral side. The front and back sides are each planar. A plurality of mounting holes extends through the post and the front and back sides. The mounting holes receive fasteners to mount the post to a cement form. A sleeve is attached to the top end of the post. The sleeve has an opening extending therethrough having a longitudinal axis that is orientated perpendicular to the post and is perpendicular to and extends through a plane of the front side. An arm has a first end, a second end, and a perimeter wall extending therebetween. The arm extends through the sleeve and is movable forward or rearward through the sleeve. A leg is attached to and extends downwardly from the arm adjacent to the first end. The leg has a height that is less than the post. An anchor plate is attached to a distal end of the leg with respect to the arm. The anchor plate has a mounting aperture extending therethrough to receive a coupler to engage a panel. The anchor plate retains the panel such that that panel abuts a keyway form.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
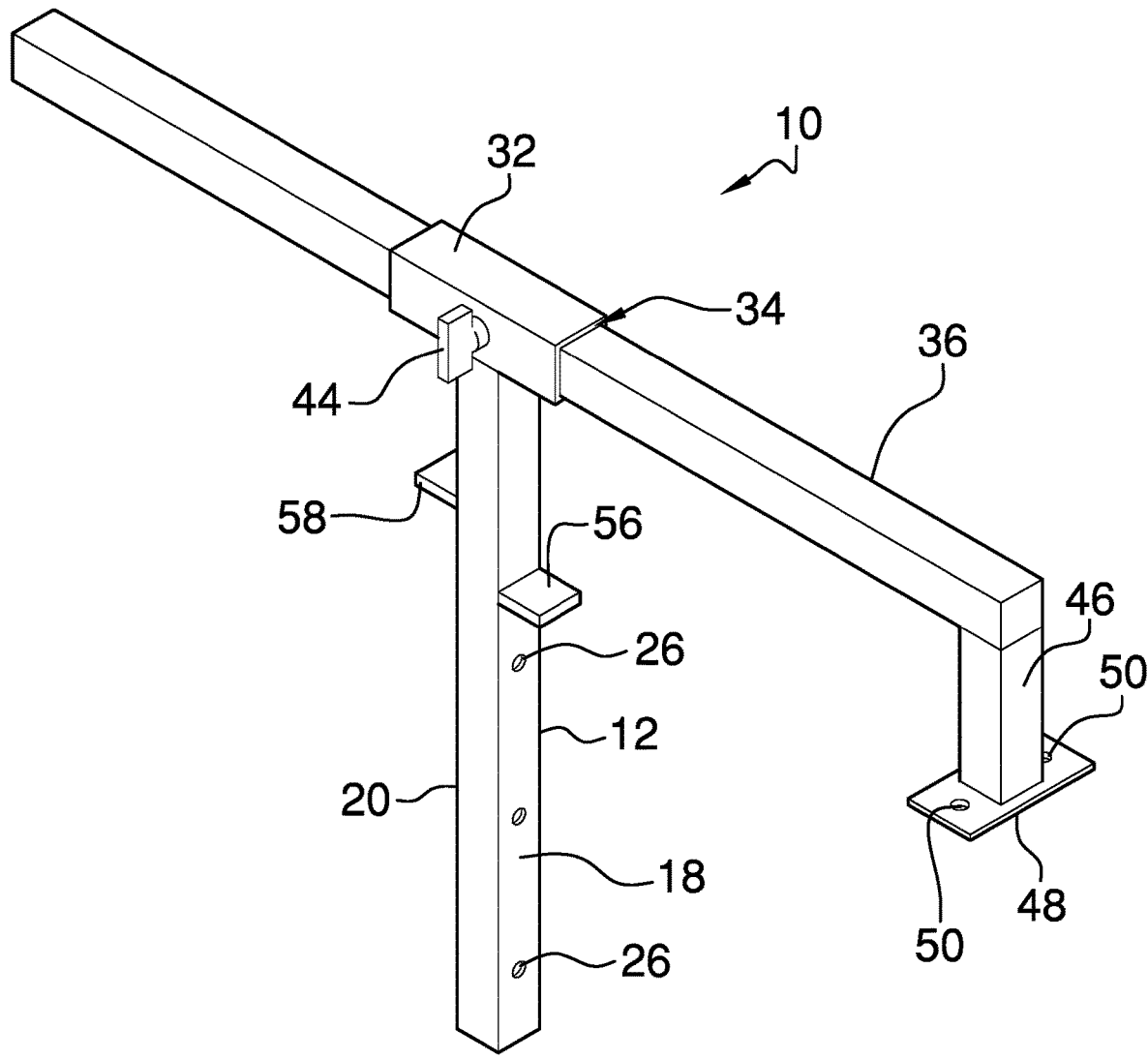
FIG. 1 is a front isometric view of a keywell form retention assembly according to an embodiment of the disclosure.
Figure 2:
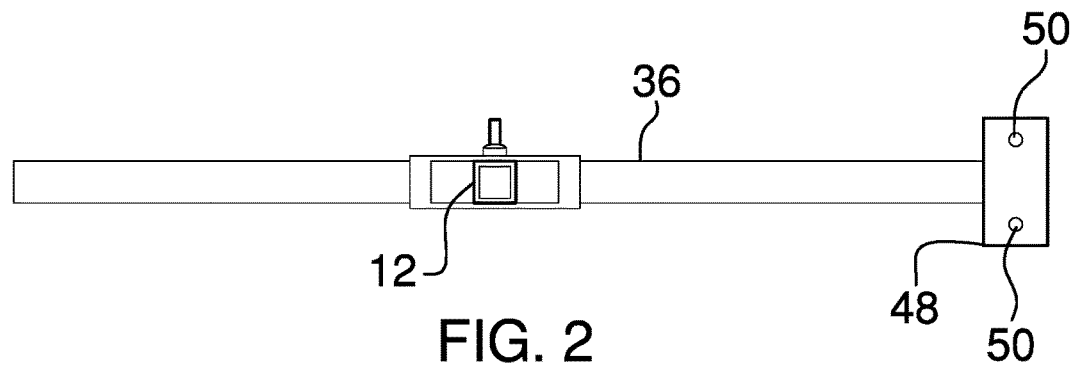
FIG. 2 is a bottom view of an embodiment of the disclosure.
Figure 3:
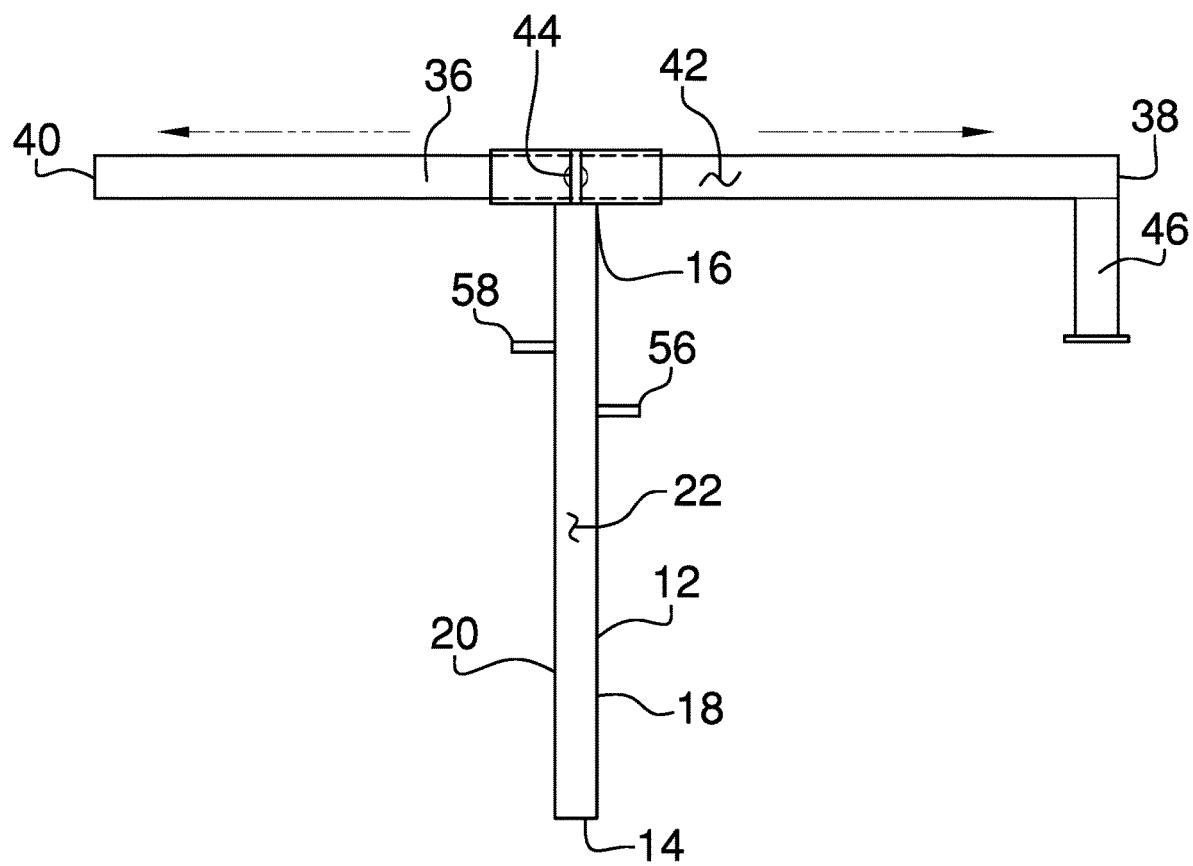
FIG. 3 is a left side view of an embodiment of the disclosure.
Figure 4:
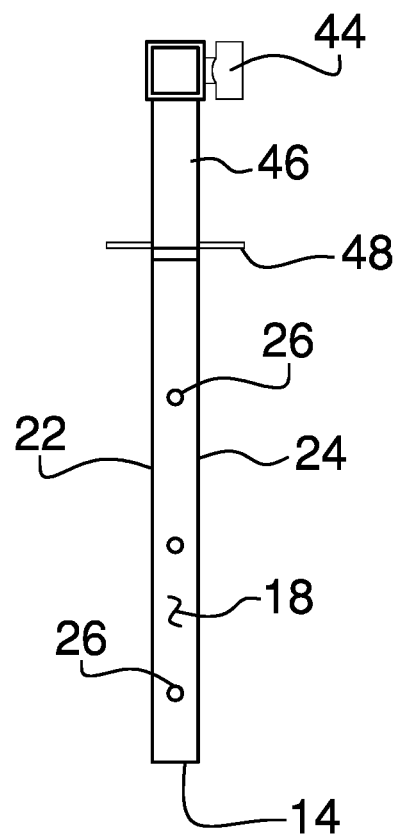
FIG. 4 is a front view of an embodiment of the disclosure.
Figure 5:
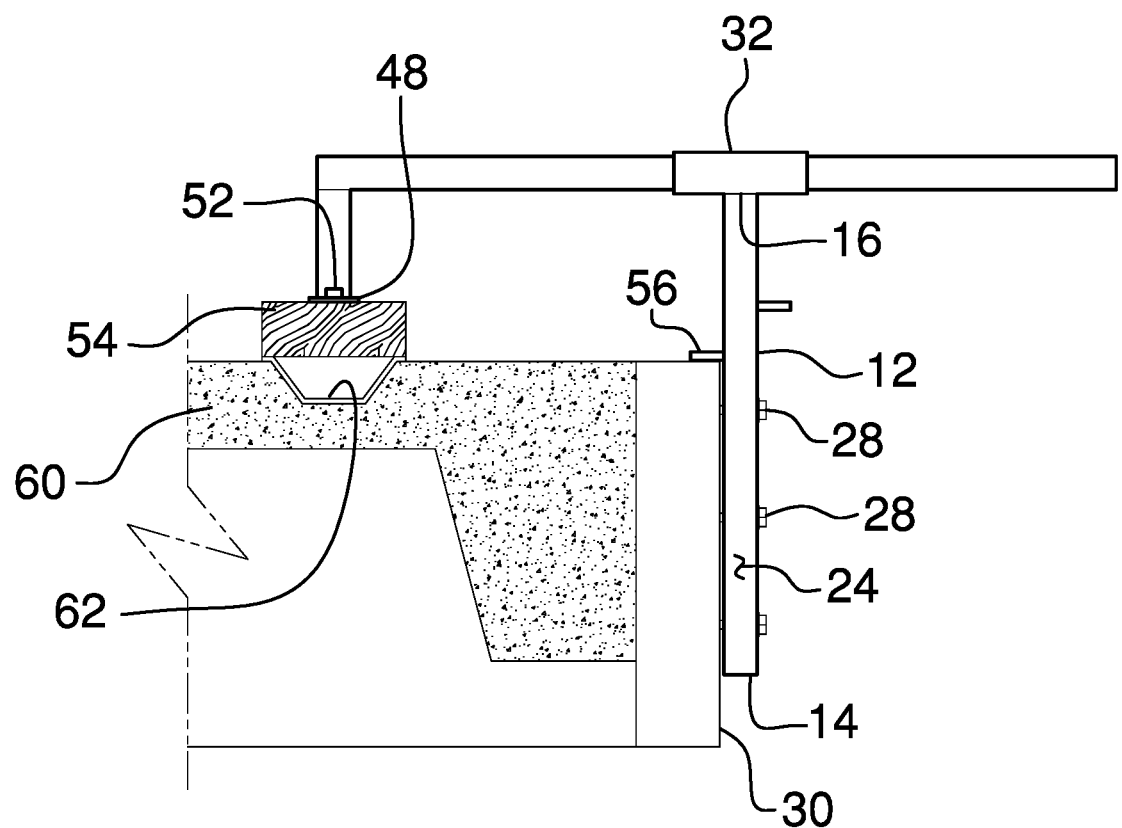
FIG. 5 is a right side in-use view of an embodiment of the disclosure.

With reference now to the drawings, and in particular to FIGS. 1 through 5 thereof, a new cement form support device embodying the principles and concepts of an embodiment of the disclosure and generally designated by the reference numeral 10 will be described.

As best illustrated in FIGS. 1 through 5, the keywell form retention assembly 10 generally comprises a post 12 having a vertical orientation and which has a bottom end 14 and a top end 16. While the assembly 10 may be used in alternate directions, the term "vertical orientation" for the post 12 is utilized here for simplification of describing the assembly 10 and should not be taken to mean that the post 12 may only be vertically positioned. The post 12 has a height from the top end 16 to the bottom end 14 that is between 12.0 inches and 20.0 inches and which, in some embodiments is equal to approximately 15.0 inches. The post 12 may have a square or rectangular cross-section taken perpendicular to a line extending through the top 16 and bottom 14 ends with a width and depth each between 0.75 inches and 2.0 inches. The post 12 therefore includes a front side 18, a back side 20, a first lateral side 22 and a second lateral side 24, wherein the front 18 and back 20 sides are each planar. A plurality of mounting holes 26 extends through the post 12 wherein the mounting holes 26 extend through the front 18 and back 20 sides. The mounting holes 26 are configured to receive fasteners 28 to mount the post 12 to a cement form 30.

A sleeve 32 is attached to the top end 16 of the post 12. The sleeve 32 has an opening 34 extending therethrough that has a longitudinal axis that is orientated perpendicular to the post 12 and is perpendicular to and extends through a plane of the front side 18. The sleeve 32 and the opening 34 may be rectangular or squared as is apparent from FIG. 1. An arm 36 has a first end 38, a second end 40, and a perimeter wall 42 extending therebetween. The arm 36 extends through the sleeve 32 and is movable forward or rearward through the sleeve 32. The arm 36 has a length from the first end 38 to the second end 40 between 18.0 inches and 32.0 inches and in one embodiment the arm 36 has a length equal to approximately 24.0 inches. A locking member 44 engages the sleeve 32 and the arm 36 to releasably retain the arm 36 in a fixed position relative to the post 12. The locking member 44 may comprise, for example, a thumb screw threadably coupled to the sleeve 32 and frictionally engageable with the arm 36.

A leg 46 is attached to and extends downwardly from the arm 42 adjacent to the first end 38. The leg 46 has a height of between 2.0 inches and 6.0 inches and in one embodiment has a length equal to 3.25 inches. The leg 46 is oriented perpendicular to the arm 42. An anchor plate 48 is attached to a distal end of the leg 46 with respect to the arm 42. The anchor plate 48 lies in a horizontal plane when the post 12 has a vertical orientation. The anchor plate 48 has a mounting aperture 50 extending therethrough configured to receive a coupler 52 to engage a panel 54, wherein the panel 54 may comprise a wooden plank, for example. The anchor plate 48 has width of about 3.0 inches a depth of 1.5 inches. The anchor plate 48 is about 0.25 inches high and will typically be comprised of a metallic material. As can be seen in FIG. 1, the anchor plate 48 may have a multiple mounting apertures 50 extending therethrough. The coupler 52 may comprise a screw or nail.

A front tab 56 is attached to and extends away from the front side 18. The front tab 56 is positioned between 4.0 and 8.0 inches downwardly away from the top end 16 and in one embodiment is 4.75 inches from the sleeve 32. The front tab 56 extends away from the front side 18 a distance of between 0.75 inches and 2.0 inches. The front tab 56 may be used to position on the upper edge of the cement form 30 to stabilize the assembly 10 while the assembly 10 is mounted to the cement form 30. A rear tab 58 may be attached to and extend way from the back side 20. The rear tab 58 is positioned nearer to the top end 16 than the front tab 56. The rear tab 58 is positioned at least 0.50 inches higher than the front tab 56 and may be positioned 4.25 inches from the sleeve 32. The rear tab 58 extends away from the back side 20 a distance of between 0.75 inches and 2.0 inches. The rear tab 58 allows the arm 36 to be reversed relative to the sleeve 32 to select how far above the upper edge of the cement form 30 the anchor plate 48 will be positioned.

In use, the post 12 is attached to the cement form 30 with fasteners 28 such that the anchor plate 48 is positioned over the cement 60 and the keyway form 62. The anchor plate 48 is attached to a plank 54, such as a two by four, and abutted against and extended along a length of the keyway form 62 positioned in cement 60. The anchor plate 48 and/or plank 54 may also be secured to the keyway form 62 to assist in removing the keyway form 62 after curing of the cement 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A keyway form holding assembly configured to retain a keyway form in cement while the cement is curing, the assembly comprising:
   a post having a vertical orientation and having a bottom end and a top end, the post having a front side, a back side, a first lateral side and a second lateral side, the front and back sides each being planar, a plurality of mounting holes extending through the post, the mounting holes extending through the front and back sides, wherein the mounting holes are configured to receive fasteners to mount the post to a cement form;
   a sleeve being attached to the top end of the post, the sleeve having an opening extending therethrough having a longitudinal axis being orientated perpendicular to the post and being perpendicular to and extending through a plane of the front side;
   an arm having a first end, a second end, and a perimeter wall extending therebetween, the arm extending through the sleeve and being movable forward or rearward through the sleeve;
   a leg being attached to and extending downwardly from the arm adjacent to the first end, the leg having a height being less than the post;
   an anchor plate being attached to a distal end of the leg with respect to the arm, the anchor plate having a mounting aperture extending therethrough configured to receive a coupler to engage a panel;
   wherein the anchor plate retains the panel such that that panel abuts a keyway form; and
   a front tab being attached to and extending away from the front side, the front tab being positioned between 4.0 and 8.0 inches downwardly away from the top end.

2. The keyway form holding assembly according to claim 1, wherein the post has a height from the top end to the bottom end being between 12.0 inches and 20.0 inches.

3. The keyway form holding assembly according to claim 1, wherein the arm has a length from the first end to the second end between 18.0 inches and 32.0 inches.

4. The keyway form holding assembly according to claim 1, wherein the leg has a height of between 2.0 inches and 6.0 inches.

5. The keyway form holding assembly according to claim 1, Wherein the anchor plate lies in a horizontal plane when the post has a vertical orientation.

6. The keyway form holding assembly according to claim 1, wherein the front tab extends away from the front side a distance of between 0.75 inches and 2.0 inches.

7. The keyway form holding assembly according to claim 1, further including a rear tab being attached to and extending way from the back side, the rear tab being positioned nearer to the top end than the front tab.

8. The keyway form holding assembly according to claim 7, wherein the rear tab is positioned at least 0.50 inches higher than the front tab.

9. The keyway form holding assembly according to claim 8, wherein the front and rear tabs each extend away from the back side a distance of between 0.75 inches and 2.0 inches.

10. The keyway form holding assembly according to claim 1, further including a locking member engaging the sleeve and the arm to releasably retain the arm in a fixed position relative to the post.

11. A keyway thrm holding assembly configured to retain a keyway form in cement while the cement is curing, the assembly comprising:
- a post having a vertical orientation and having a bottom end and a top end, the post having a height from the top end to the bottom end being between 12.0 inches and 20.0 inches, the post having a front side, a back side, a first lateral side and a second lateral side, the front and back sides each being planar, a plurality of mounting holes extending through the post, the mounting holes extending through the front and back sides, wherein the mounting holes are configured to receive fasteners to mount the post to a cement form;
- a sleeve being attached to the top end of the post, the sleeve having an opening extending therethrough having a longitudinal axis being orientated perpendicular to the post and being perpendicular to and extending through a plane of the front side;
- an arm having a first end, a second end, and a perimeter wall extending therebetween, the arm extending through the sleeve and being movable forward or rearward through the sleeve, the arm having a length from the first end to the second end between 18.0 inches and 32.0 inches;
- a leg being attached to and extending downwardly from the arm adjacent to the first end, the leg having a height of between 2.0 inches and 6.0 inches;
- an anchor plate being attached to a distal end of the leg with respect to the arm, the anchor plate lying in a horizontal plane when the post has a vertical orientation, the anchor plate having a mounting aperture extending therethrough configured to receive a coupler to engage a panel;
- a front tab being attached to and extending away from the front side, the front tab being positioned between 4.0 and 8.0 inches downwardly away from the top end, the front tab extending away from the front side a distance of between 0.75 inches and 2.0 inches;
- a rear tab being attached to and extending way from the back side, the rear tab being positioned nearer to the top end than the front tab, the rear tab being positioned at least 0.50 inches higher than the front tab, the rear tab extending away from the back side a distance of between 0.75 inches and 2.0 inches;
- a locking member engaging the sleeve and the arm to releasably retain the arm in a fixed position relative to the post; and
- wherein the anchor plate retains the panel such that that panel abuts a keyway form.

\* \* \* \* \*